United States Patent Office 3,178,157
Patented Apr. 13, 1965

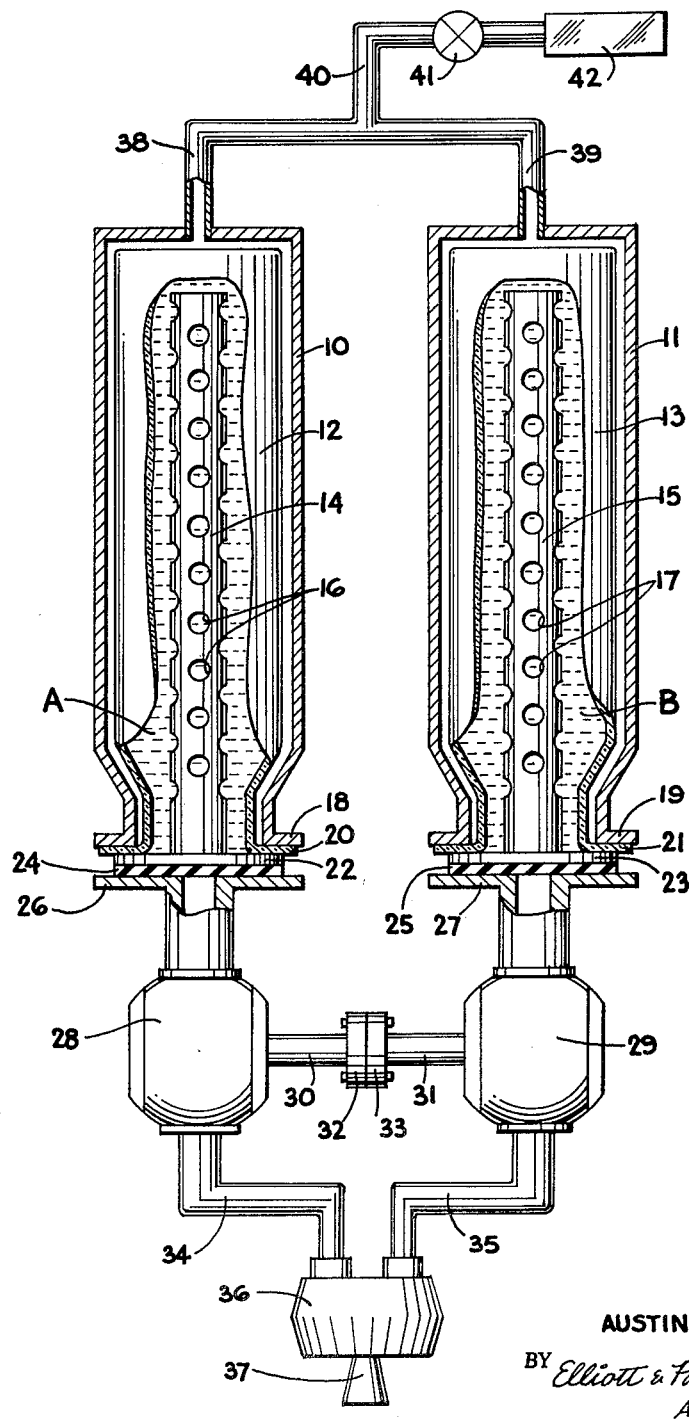

3,178,157
PORTABLE FOAM GENERATING APPARATUS
Austin Cole III, Santa Monica, Calif., assignor to United Process Machinery Co., a corporation of California
Filed May 15, 1962, Ser. No. 194,903
5 Claims. (Cl. 259—4)

This invention relates generally to foaming apparatus and more particularly to a novel portable foam generating apparatus to provide a source of foam material under required mixing conditions and in a relatively rapid manner.

Conventionally, foam is formed by combining in the mixing head an extremely volatile material such as toluene di-isocyanate with resin. In this connection, it is of paramount importance that a given ratio of these two materials to be received in the mixing head in order to yield the desired type foam. To provide necessary pressure, proper proportion of materials, and suitable safety measures in view of the active nature of the materials involved has heretofore necessitated the use of relatively complicated and bulky equipment. As a consequence, the various applications for foam material have been somewhat limited.

There are many instances in which a portable foam generating apparatus would be highly desirable. For example, a life raft could be inflated with foam material rather than air. Since the foam material under consideration is made up of closed cells, it has excellent buoyant properties and even should the raft become damaged, it will still float.

Another application somewhat similar in principle would be to float objects to the surface of a lake or ocean by inflating under water a flexible enclosure with the foam after the enclosure has been secured to the object to be raised. Again, the extremely buoyant properties of the foam will provide the necessary lifting force.

In both of the foregoing illustrative examples, the only practical means of achieving the desired results is to provide a small, compact, and efficient foam generating means in which adequate pressure is available, adequate storage is provided for the separate ingredients to be mixed, and in which proper proportions of the ingredients can be realized.

With all of the foregoing in mind, it is a primary object of this invention to provide a novel foam generating apparatus useful in applications such as described above.

More particularly, it is an object to provide a novel portable foam generating apparatus incorporating storage means for the necessary materials to be mixed together which are compact and in which desired ratios are automatically and positively maintained throughout the foaming process.

Still another object is to provide a small, compact, and relatively inexpensive portable foaming apparatus for any one of a variety of different uses in which conventional industrial equipment available at the present time is not particularly suited.

Briefly, these and many other objects and advantages of this invention are attained by providing first and second storage means in the form of housings or tanks. Within these tanks, there are provided polyethylene bags for holding the various ingredients to be mixed together to form the foam. Generally, polyethylene is inert to the active ingredients involved and is therefore suitable for this purpose.

A pressure source is placed in communication through a suitable valve with the region between the exterior of the bags and the interior of the tanks so that application of pressure will tend to collapse the bags and thus force the materials contained therein out the open ends of the bags and containers. In this connections, in order to avoid inadvertent collapsing of the bag at a point which might cut off the flow of material therefrom, there are incorporated, in accordance with an important feature of this invention, rigid polyethylene tubes extending into the interior of the bags and provided with a series of lateral openings. Collapsing of the bags about the peripheral surface of the tubes will thus not in any way shut off the flow of material from the bags.

In accordance with further features of the invention, the outlet ends of the bags are sealed by flexible diaphragms designed to rupture only after a given pressure has been exceeded. Further, there are provided first and second positive displacement means connected to the outlet ends of the bags on the other sides of the diaphragms, these displacement means being physically coupled together so that a fixed ratio of the materials from the various tanks will be provided.

The foregoing assembly is completed by a mixing head arranged to receive the respective materials from the positive displacement means.

A better understanding of the invention will be had by now referring to a preferred embodiment thereof as schematically depicted in the single drawing, in which:

The drawing constitutes a cut-away elevational view of a preferred form of portable foam generating apparatus in accordance with the invention.

Referring to the drawing, the apparatus includes first and second tanks 10 and 11 incorporating therein flexible polyethylene bags 12 and 13. Also included are polyethylene tubes 14 and 15 extending within the interior of the bags respectively. These tubes are provided with a plurality of side openings such as indicated at 16 and 17, respectively.

The lower ends of the tanks 10 and 11 terminate in outwardly directed flanges 18 and 19 against which the open ended lip portions of the bags 12 and 13 are adapted to be sealed as indicated at 20 and 21. By this arrangement, there is defined between the exterior portions of the polyethylene bags 12 and 13 and the interior portions of the tanks 10 and 11 first and second sealed spaces or regions.

The open ended lip portions 20 and 21 of the bags are further secured against the flanges 18 and 19 by circular flanges 22 and 23 formed on the ends of the polyethylene tubes 14 and 15.

Positioned over the open ends of the tubes, respectively, are provided flexible diaphragms 24 and 25. These diaphrgams in turn are held in place by flanges 26 and 27 forming the inlet portions of positive displacement flow control means 28 and 29, respectively.

The first and second positive displacement flow control means 28 and 29 have their shafts 30 and 31 physically connected together as indicated by the flanges 32 and 33. Alternatively, the shafts 30 and 31 could be connected to rotate in a given ratio with respect to each other by any suitable gear reduction means positively connecting the shafts and positioned between the flanges 32 and 33.

The outlet ends of the first and second positive displacement flow control means are shown at 34 and 35 passing into a foam mixing head 36 having an outlet nozzle 37.

Extending from the top of the tanks 10 and 11 are inlet conduits 38 and 39 branching from a common conduit 40 connected to the output end of a valve 41. The inlet end of the valve 41 connects to a pressure source 42, such as compressed nitrogen.

In the operation of the foaming apparatus as described above, the polyethylene bags 12 and 13 are first filled with suitable materials such that when mixed together a desired foam will be formed in the mixing head 36. Thus, for example, the polyethylene bag 12 may contain toluene di-isocyanate and the polyethylene bag 13 resin. Normally, the valve 41 from the pressure source 42 is closed. The diaphragms 24 and 25 are sealed across the lower ends of the polyethylene tubes 14 and 15 so that the material is contained in a safe condition.

When an operator desires to generate foam such as to inflate a life raft or to perform some other operation, it is only necessary for him to open the valve 41 and thus apply equal pressures from the source 42 through the common conduit 40, conduits 38 and 39, to the first and second regions between the exterior of the bags 12 and 13 and the interior of the tanks 10 and 11. This pressure is confined within these regions because of the sealing relationship of the lips of the bags as at 20 and 21 to the flanges 18 and 19 of the tank.

As the pressure builds up, it will be exerted on the polyethylene bags 12 and 13 tending to collapse the same about the tubes 14 and 15. This action will force the respective first and second materials in the bags through the various openings 16 and 17 against the inner surface of the diaphragms 24 and 25. After a given pressure is exceeded, these diaphragms will rupture to pass the materials through the positive displacement flow control means 28 and 29.

The action of the materials flowing through the flow controllers 28 and 29 will cause the positive displacement means therein to rotate the shafts 30 and 31. Since these shafts are coupled together by the flanges 32 and 33, the positive displacement flow means must operate at the same speed. Therefore, in the particular example chosen for illustrative purposes, the materials will pass through the outlets 34 and 35 in an exact 1:1 volume ratio. Assuming this ratio to be the desired ratio for the materials, they will pass into the mixing head 36 which may be of the type shown and described in my co-pending (now abandoned) United States patent application Serial No. 151,806, filed November 13, 1961, for Foam Generating Apparatus. After mixing the generated foam will pass from the nozzle 37 into any suitable structure which is to contain the foam.

The foaming operation may be stopped by either closing off the mixing head 36 or by closing the pressure valve 41.

From the foregoing description, it will thus be evident that the present invention has provided a novel portable foam generating apparatus.

While only one particular embodiment of the invention has been shown and described, it is not to be thought of as limited to the particular showing set forth merely for illustrative purposes.

What is claimed is:

1. A foam generating apparatus including: first and second open ended storage means for first and second materials to be mixed together to provide said foam; first and second diaphragms closing off said first and second storage means; a single pressure source means connected to said storage means to provide substantially identical pressures to said storage means respectively, said first and second diaphrgams being designed to rupture when a given pressure from said pressure source is exceeded; and a mixing head for receiving and mixing together said first and second materials.

2. A foam generating apparatus comprising: first and second storage means for first and second materials to be mixed together to provide said foam; a mixing head; first and second positive displacement flow means connecting said first and second storage means to said mixing head respectively; a single pressure source means connected to said storage means to provide substantially identical pressures to said storage means respectively; and means physically interconnecting said first and second positive displacement means for simultaneous operation at speeds in a given ratio to each other whereby said first and second materials are supplied under said pressures to said mixing head in a given ratio.

3. A portable foam generating apparatus comprising, in combination: first and second tanks; first and second collapsible bags within said tanks respectively; first and second elongated open ended tubes having a plurality of side openings, said tubes extending within said bags; means sealing the peripheral portion of the openings of said bags to the open ends of said tanks so that there are defined substantially fluid tight regions between the exterior of said bags and the interior of said tanks; first and second positive displacement flow control means having inputs connected to the open ends of said bags for receiving first and second materials from said bags; a foam generating mixing head connected to the outputs of said positive displacement flow control means; single high pressure source means; and means for connecting said high pressure source means to said fluid tight regions so that said bags are subject to substantially identical pressures whereby the materials in said bags are urged through said first and second positive displacement flow control means to said mixing head to generate said foam.

4. An apparatus according to claim 3, including means positively coupling said first and second positive displacement flow control means together for simultaneous operation at speeds in a given ratio to each other whereby said first and second materials are supplied to said mixing head in said given ratio.

5. An apparatus according to claim 4, including first and second diaphragms closing off communication between the openings of said bags and the inputs to said flow means, said diaphragms being designed to rupture when a given pressure exerted thereon by said materials is exceeded.

References Cited by the Examiner

UNITED STATES PATENTS

| | | | |
|---|---|---|---|
| 1,409,544 | 3/22 | Hallock | 222—541 X |
| 2,543,653 | 2/51 | Woog | 137—99 |
| 2,671,579 | 3/54 | Knoblock | 222—95 X |
| 2,870,776 | 1/59 | Marsh | 137—99 |
| 2,938,650 | 5/60 | Biber | 222—136 X |
| 2,948,928 | 8/60 | Ebneth | 259—7 X |
| 2,973,883 | 3/61 | Modderno | 222—136 X |

FOREIGN PATENTS 66,802   3/57   France.

WALTER A. SCHEEL, *Primary Examiner.*
IRVING BUNEVICH, *Examiner.*